(12) United States Patent
Nanda et al.

(10) Patent No.: US 11,050,770 B2
(45) Date of Patent: Jun. 29, 2021

(54) NETWORK DEFENSE SYSTEM AND METHOD THEREOF

(71) Applicant: BAE SYSTEMS INFORMATION AND ELECTRONIC SYSTEMS INTEGRATION INC., Nashua, NH (US)

(72) Inventors: Soumendra Nanda, Billerica, MA (US); Rebecca Cathey, Apison, TN (US); Lawrence A. Clough, Jr., Reston, VA (US); Adrian E. Conway, Weston, MA (US); Fang Liu, Cupertino, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 182 days.

(21) Appl. No.: 16/053,279

(22) Filed: Aug. 2, 2018

(65) Prior Publication Data

US 2020/0045069 A1 Feb. 6, 2020

(51) Int. Cl.
*H04L 29/06* (2006.01)
*G06N 5/04* (2006.01)
*G06N 20/00* (2019.01)

(52) U.S. Cl.
CPC ......... *H04L 63/1425* (2013.01); *G06N 5/046* (2013.01); *G06N 20/00* (2019.01); *H04L 63/0263* (2013.01); *H04L 63/20* (2013.01)

(58) Field of Classification Search
CPC . H04L 63/1425; H04L 63/0263; H04L 63/20; G06N 20/00; G06N 5/046
See application file for complete search history.

(56) References Cited

U.S. PATENT DOCUMENTS

| 2004/0136378 | A1* | 7/2004 | Barrett | H04L 63/1408 370/395.2 |
| 2008/0083029 | A1* | 4/2008 | Yeh | H04L 63/1441 726/22 |
| 2008/0276317 | A1* | 11/2008 | Chandola | H04L 63/1425 726/23 |
| 2014/0053269 | A1* | 2/2014 | Ghosh | H04L 63/1416 726/23 |

(Continued)

OTHER PUBLICATIONS

Kumar, Kumar, and Sachdeva, "The Use of Artificial Intelligence Based Techniques for Intrusion Detection: A Review", Artif. Intell. Rev. Springer 2010 (Year: 2010).*

(Continued)

*Primary Examiner* — Vance M Little
(74) *Attorney, Agent, or Firm* — Sand, Sebolt & Wernow LPA; Scott J. Asmus

(57) ABSTRACT

A network defense system can include a sensor alert ingestion framework adapted to monitor network activity and alert detected or suspected anomalies. A network analyzer may be coupled to the sensor alert ingestion framework to analyze the anomalies. A course of action (CoA) simulator may be coupled to the network analyzer adapted to generate a list of decision including courses of action to address the anomalies. There may be a training and feedback unit coupled to the CoA simulator to train the system to improve responses in addressing future anomalies.

16 Claims, 6 Drawing Sheets

(56) References Cited

U.S. PATENT DOCUMENTS

| | | | | |
|---|---|---|---|---|
| 2014/0096251 | A1* | 4/2014 | Doctor | H04L 63/1408 726/23 |
| 2015/0161386 | A1* | 6/2015 | Gupta | G06F 21/44 726/23 |
| 2015/0365438 | A1* | 12/2015 | Carver | H04L 63/1416 726/1 |
| 2016/0065599 | A1* | 3/2016 | Hovor | H04L 63/1416 726/23 |
| 2017/0034187 | A1* | 2/2017 | Honig | G06N 20/00 |
| 2017/0374091 | A1* | 12/2017 | Igbe | G06N 20/00 |
| 2018/0114591 | A1* | 4/2018 | Pribanic | G16H 10/60 |

OTHER PUBLICATIONS

Beaudoi et al., "Autonomic Computer Network Defence Using Risk State and Reinforcement, Learning," Defense Research and Development Canada, University of Ottawa, The Virtual Battlefield: Perspectives on Cyber Warfare, IOS Press, 2009, 11 pages.

* cited by examiner

NETWORK DEFENSE SYSTEM AND METHOD THEREOF

STATEMENT OF GOVERNMENT INTEREST

This invention was made with government support under Prime Contract No. FA8750-17-C-0039 awarded by the U.S. Air Force. The government has certain rights in the invention.

BACKGROUND

Technical Field

The present disclosure relates to a system of defending a monitored network. More particularly, the system may have a network analyzer coupled to a sensor alert ingestion framework to analyze anomalies, and a course of action simulator coupled to the network analyzer to generate a list of decision including courses of action to address the anomalies.

Background Information

Existing enterprise-scale attack detection systems (such as FireEye, Snort, Bro) detect anomalous network activity but lack the capacity to do more than categorize, rank and report them. Given the volume of alerts, system administrators rely on personal subject matter expertise to select which alerts are critical and which alerts can be ignored. Many current network defense systems use some level of automation (e.g., automatic blocking of outbound traffic to known bad addresses) but most of the automation is in the form of hand-coded fixed rules developed by human operators. Skilled cyber analysts are in high demand and the supply is small relative to the DoD's (Department of Defense) cyber defense needs.

Reliance on subject matter expertise carries the risk of overlooking new threats and variants of known threats. For example, during the November 2014 attack on retailer Target, five high-priority malware alerts flagged the emerging threat. Yet, due to poor team coordination amidst the high volume of daily alerts, these alerts were downgraded to "ignore" by the team responsible for manually reviewing alerts. These errors persisted for months and the results were catastrophic for Target and its customers.

Previously demonstrated was a risk-adjusted autonomic response to a zero-day worm using partially observable Markov decision process (POMDP).

Many recent breakthrough advances in Machine Learning (ML) and Artificial Intelligence (AI) in the recent news, such as Google's AlphaGo defeating the top human Go player in the world in 2016, suggests these techniques can reason over complex trades in the context of both current and future reward. Improvements in ML techniques such as Deep Learning, Q-Learning and other variants of reinforcement and semi-supervised algorithms provide research opportunities for the cognitive and decision making aspects of cyber network defense and CoA evaluation.

Previous attempts at using machine learning for proactive network security have had mixed success. Traditional techniques such as Support Vector Machines (SVMs) are good at recognizing patterns, but they are too dependent on prior training based on historic patterns. Applying machine learning to make better decisions only solves half of the problem. We also need to evaluate the risk-reward tradeoffs of applying those decisions in a complex and dynamic environment. We propose to apply multiple parallel simulations to quantify the impact of decisions before they are applied on a real network.

The large volume of alerts combined with the need to avoid service disruption puts the security analyst in a difficult position. Because the human operator is unable to analyze all alerts fully, system administrators select which incident alerts are critical based on personal subject-matter experience. Their mitigating course-of-action (CoA) only occurs when there is a very high degree of certainty that the response is both necessary and that any service disruption is justifiable. Thus, the time from intrusion to detection to resolution can range from a few hours to days (or even months) while the adversary can adapt their offensive tactics at a much faster rate.

SUMMARY

The volume of alerts coupled with the limited ability to accurately access cyber situational awareness has created a slower and reactive culture where administrators usually only respond to confirmed threats. One reason for the slow adoption of proactive and autonomic defenses is that many commercial and military systems cannot tolerate accidental service disruption due to false alarms. In hindsight, the Target attack could have been mitigated by automatically increased monitoring of suspicious nodes, isolating infected nodes, or network throttling of the 11 GB of outbound data to FTP sites abroad (to buy more time before fielding a manual response). Yet, if this were a false alarm, Target would have lost significant revenue in lost sales or failed credit-card transactions. Thus, there are several tradeoffs to consider before taking autonomic actions.

One exemplary problem is that defenders lack the tools necessary to (1) broadly infer network state from volumes of alerts; (2) identify a suitable course-of-action (CoA) aligned to a confidence level; and (3) understand the broader impact of the CoA on the overall system.

Future autonomic defensive systems may be reduce the system administrator's response time, by applying automated network analysis to coalesce the high volume of alerts, into an output set of recommended CoAs, with corresponding measures of confidence, and estimated forecasts of their future network impact. While research has continued to mature, the ability to infer cyber threat from large volumes of alerts, operators still lack this critical ability to automatically estimate and quantify of the potential immediate and longer-term impacts of a CoA on the overall enterprise.

Next-generation autonomic defensive systems coupled with machine learning have the potential to address these challenges. Such an autonomic system must recognize threats within large volumes of alerts and then automatically select a response proportional to the threat's risk.

The present disclosure envisions an autonomic system that presents operators with an automatically generated CoA and corresponding risk-benefit tradeoffs. After sufficient testing and maturation, this system may be trusted to bypass operators and apply the CoA directly on the network and, thus, execute complex responses at machine speeds while avoiding unintentional consequences.

The present disclosure provides an integrated system that applies advances in machine learning with simulation-based risk assessment to address these challenges. The solution assists operators execute corrective actions quickly and with high accuracy. Additionally provided is a fully autonomic network defense system that can be trusted to operate independently and learn from operational experiences.

In accordance with one aspect, an embodiment of the present disclosure may provide an autonomic network decision maker including POMDP, an intrusion detection systems, and traffic model simulation to perform network analysis and provide course of actions with training and experimental feedback.

The present disclosure includes a suite of anomaly detectors and a static expert rules-based Course of Action (CoA) engine. These services decide and determine which decisions to take when receiving a large volume of anomalies from individual network based sensors. The system of the present disclosure reuses these sensors along with our shared internal cyber operations testing and evaluating infrastructure (CyberNet) used to validate relevance to real-world networks.

The traffic model simulation models future of an enterprise network system via high fidelity full-stack emulation of many (i.e., hundreds) of nodes. The system of the present disclosure may use this capability to perform faster-than-real-time simulations of traffic models for enterprise-sized networks. The system of the present disclosure may also adapts existing network simulators, but way of non-limiting example ns3 and an emulator (CORE).

The system of the present disclosure may provide an Autonomous Decision Maker for Improved Network resiliency (ADMIN). ADMIN may be an autonomic network defense system comprising of: a) machine learning algorithms or processes designed to aggregate and analyze network context and content; and b) network simulation tools to predict and evaluate the impact of potential corrective actions (i.e., CoA). Admin addresses the sub-problems of: (i) what are appropriate corrective actions and what will be the impact of applying these actions on the future state of the network, and (ii) how to develop, train and test an autonomic system. To answer these questions, ADMIN may provide the following technologies integrated within a sensor alert ingestion framework.

ADMIN system is designed to act as an algorithmic analog of a human administrator or team of administrators. In correspondence with the OODA loop-based design, some non-limiting high-level challenges that ADMIN system needs to solve may include: (Orient) Network Analysis: How does ADMIN system analyze the current state of the network? What is the full set of states that should be defined? How does ADMIN system map from alerts to states? How does ADMIN system deal with high volumes of alerts, duplicate alerts, and overlapping states? (Decide) Course of Action Simulator: Given a current network state, how does ADMIN system decide what action or set of actions to take? How much historical information should be considered? How should ADMIN system define the rules and precedence for actions to take and how do we modify them? How does ADMIN system predict and evaluate the relative and absolute future impact of the actions that ADMIN system suggests? What are the quantitative metrics to describe and compare security and performance outcomes? What is the tradeoff between simulation fidelity, network size and time to complete a simulation result? (Act) Online Training via Q-Learning: How should ADMIN system adapt when it makes an incorrect decision? How do we bootstrap an ADMIN system and build the initial rules? How do we override bad decisions?

Some exemplary processes, techniques, or algorithms that ADMIN system applies includes statistical anomaly detection, machine learning and expert systems, traffic model simulation, reinforcement and self-training mechanisms, sensor ingestion framework, network Analysis, POMDP, and Course of Action (CoA) Simulator.

In one aspect, an exemplary embodiment of the present disclosure may provide a network defense system comprising: a sensor alert ingestion framework adapted to monitor network activity and alert detected or suspected anomalies; a network analyzer coupled to the sensor alert ingestion framework adapted to analyze the anomalies; a course of action (CoA) simulator coupled to the network analyzer adapted to generate a list of decision including courses of action to address the anomalies; and a training and feedback unit coupled to the CoA simulator to train the system to improve responses in addressing future anomalies. This exemplary embodiment or another exemplary embodiment may further provide a decision engine; and a traffic modeler coupled to the decision engine. This exemplary embodiment or another exemplary embodiment may further provide traffic models formed in the traffic model based on observed network traffic. This exemplary embodiment or another exemplary embodiment may further provide wherein the observed network traffic is continuously observed. This exemplary embodiment or another exemplary embodiment may further provide a decision list including the courses of action to address the anomalies, wherein the decision list includes quantitatively and qualitatively evaluated remedial actions generated from parallel simulations. This exemplary embodiment or another exemplary embodiment may further provide predicted future consequences on the network of at least one course of action included in the decision list. This exemplary embodiment or another exemplary embodiment may further provide templates for building facts that trigger rules for at least one of the course of action to occur. This exemplary embodiment or another exemplary embodiment may further provide wherein the courses of action include network traffic shaping. This exemplary embodiment or another exemplary embodiment may further provide wherein the network traffic shaping includes: a reduction in bandwidth to slow an exchange of information across a communication link between one of (i) nodes in the network, and (ii) traffic across a gateway to the network. This exemplary embodiment or another exemplary embodiment may further provide wherein the courses of action include selective packet elimination. This exemplary embodiment or another exemplary embodiment may further provide a rule-based database to analyze severity of suspected adversarial behavior across the network.

In yet another aspect, another embodiment of the present disclosure may provide a method for network defense comprising: detecting anomalies in network activity; analyzing the detected anomalies to determine a likelihood that network conditions align with network states and suggesting a corrective action based on a current network state; generating a list of decisions including courses of action to address the anomalies and effecting an execution of at least one course of action; and training a system to improve responses in addressing future anomalies.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
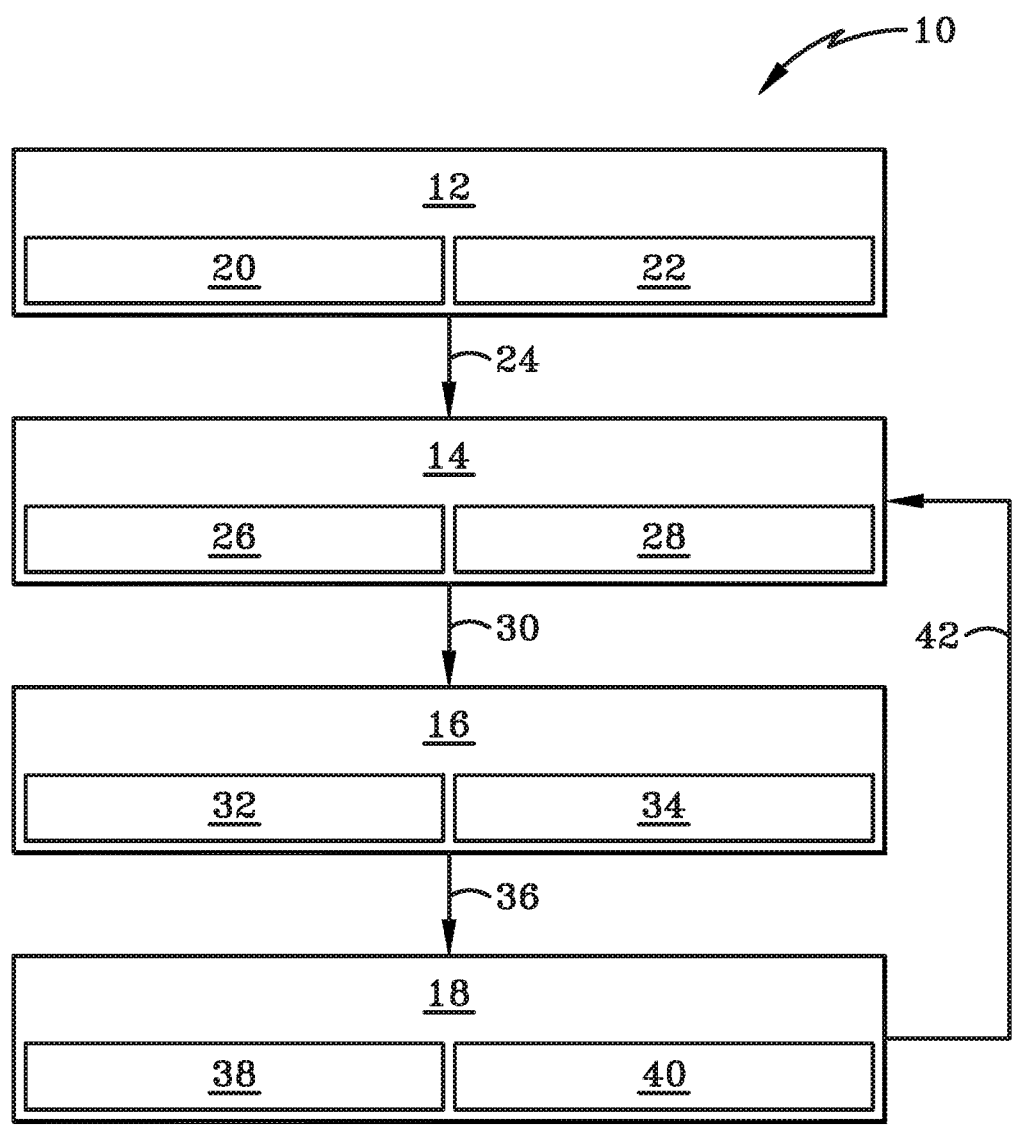
FIG. 1 (FIG. 1) is a schematic view of an autonomous decision maker for improved network resilience.

FIG. 1 depicts, in a general schematic view, an autonomous decision maker for improved network resilience (ADMIN) system generally at 10. ADMIN system 10 may generally include a sensor alert ingestion framework 12, network analyzer 14, a course of action (CoA) simulator 16, and training and experimental feedback 18.

Sensor alert ingestion framework 12 may include anomaly sensors 20. Anomaly sensors 20 may be existing legacy sensors or they may be new sensors implemented in system 10. The sensors 20 may be extended with existing intrusion detection system (IDS) tools, such as Snort and Bro, which are shown generally at 22. Framework 12 is coupled to network analyzer 14 via link 24. Link 24 may be any wired or wireless connection. In one particular embodiment, digital information or data is configured to flow from framework 12 to network analyzer 14. Accordingly, framework 12 may be considered "upstream" from network analyzer 14. Stated otherwise, network analyzer 14 may be consider "downstream" from framework 12. As will be described in greater detail below, framework 12 sends anomaly reports downstream along link 24 to the network analyzer 14.

Network analyzer 14 may include a Partially Observable Markov Decision Processes (POMDPs) engine 26 that is configured to estimate state and propose responses 28. Network analyzer 14 is positioned upstream and connected to the CoA simulator 16 via link 30. Link 30 may be wired or wireless connection. As will be described in greater detail below, network analyzer 14 is configured to send network state estimate and suggestions downstream along link 30 to CoA simulator 16.

CoA simulator 16 may include and may perform parallel packet level simulations 32 and predict future impacts 34. CoA simulator 16 is positioned upstream and connected to feedback 18 via link 36. Link 36 may be a wired or wireless connection. As will be described in greater detail below, CoA simulator 16 sends one or more ranked list of actions to an operator or sends instructions to execute the ranked list of actions downstream along link 36 to the training and experimental feedback 18.

Feedback 18 includes online Q-learning 38 that improves decisions over time 40. Feedback 18 is positioned downstream from and connected to CoA simulator 16. Feedback is also connected back to network analyzer 14 via link 42. Link 42 may be wired or wireless. Feedback 18 sends along link 42 to network analyzer 14 that enables system 10 to be tuned and optimized via training and experience.

Figure 2:
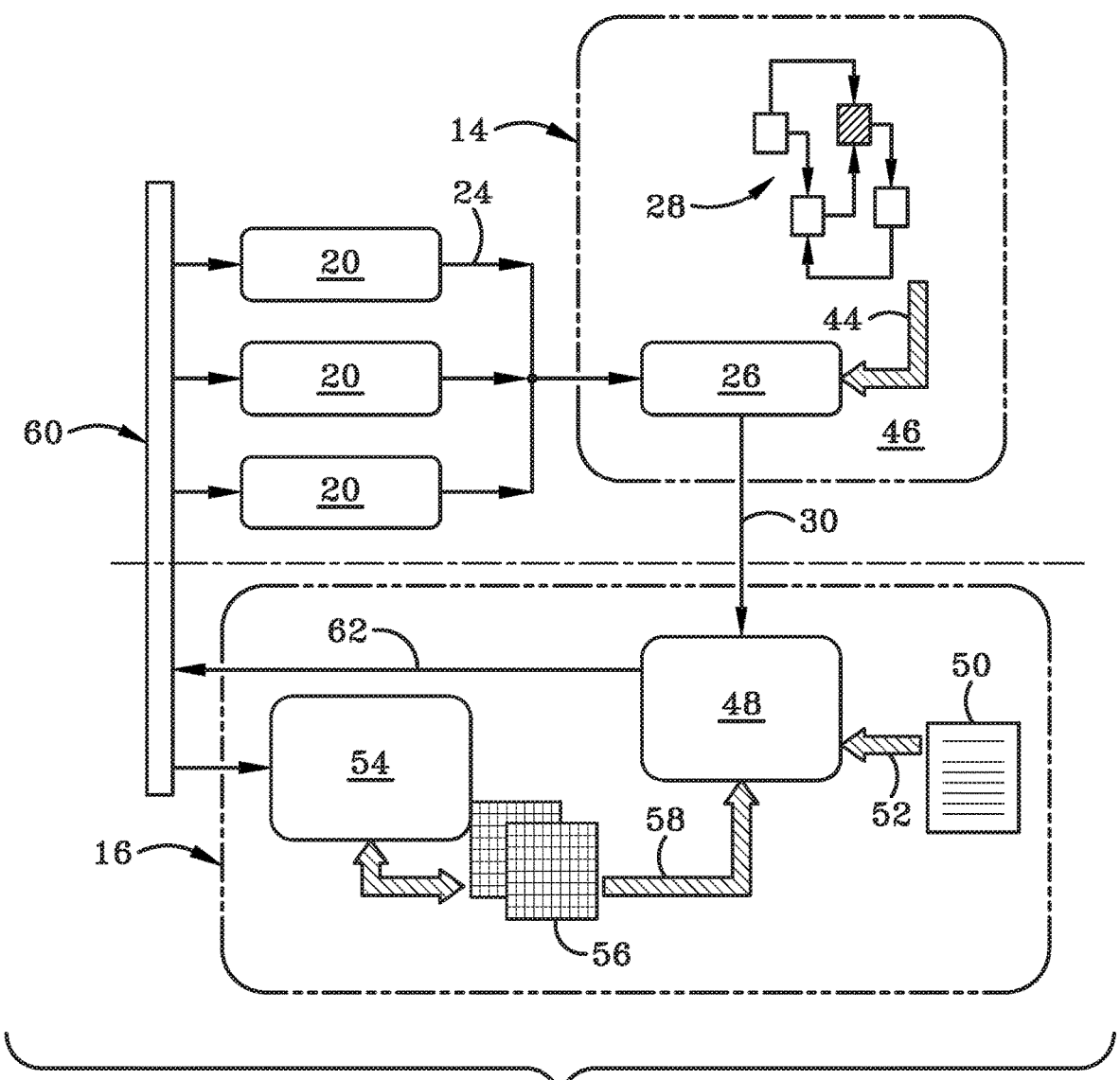
FIG. 2 (FIG. 2) is a diagrammatic view of the architecture of the autonomous decision maker for improved network resilience.

FIG. 2 depicts a general architectural view of ADMIN system 10. There may be a plurality of anomaly detectors 20 connected to analyzer 14 via link 24. The estimated state and proposed responses 28 are linked with the POMDP 26 via link 44, which may be wired or wireless, to form an Alpha Lightweight Autonomic Defense System (ALPHALADS) 46.

A decision engine 48 (which may also be referred to herein as network simulator 48) is part of the CoA simulator 16 that receives data over link 30. Decision engine 48 receives actions to test 50 over link 52, which may be wired or wireless. Further, a traffic model simulator 54, which may also be referred to as modeler 54, is part of simulator 16 (FIG. 1) that simulates predictive traffic models 56 along link 58, which may be wired or wireless, between the modeler 54 and the decision engine 48. A communication bus 60 links the modeler 54 of the CoA simulator 16 (FIG. 1) with the anomaly detectors 20 in the sensor alert ingestion framework 12. The decision engine 48 is linked with the communication bus 60 via link 62, which may be wired or wireless. The decisions that improve over time 40 may be sent along link 62 as part of the feedback that moves along link 42 (FIG. 1) from the experimental feedback 18 (FIG. 1) to the network analyzer 14.

Figure 3:
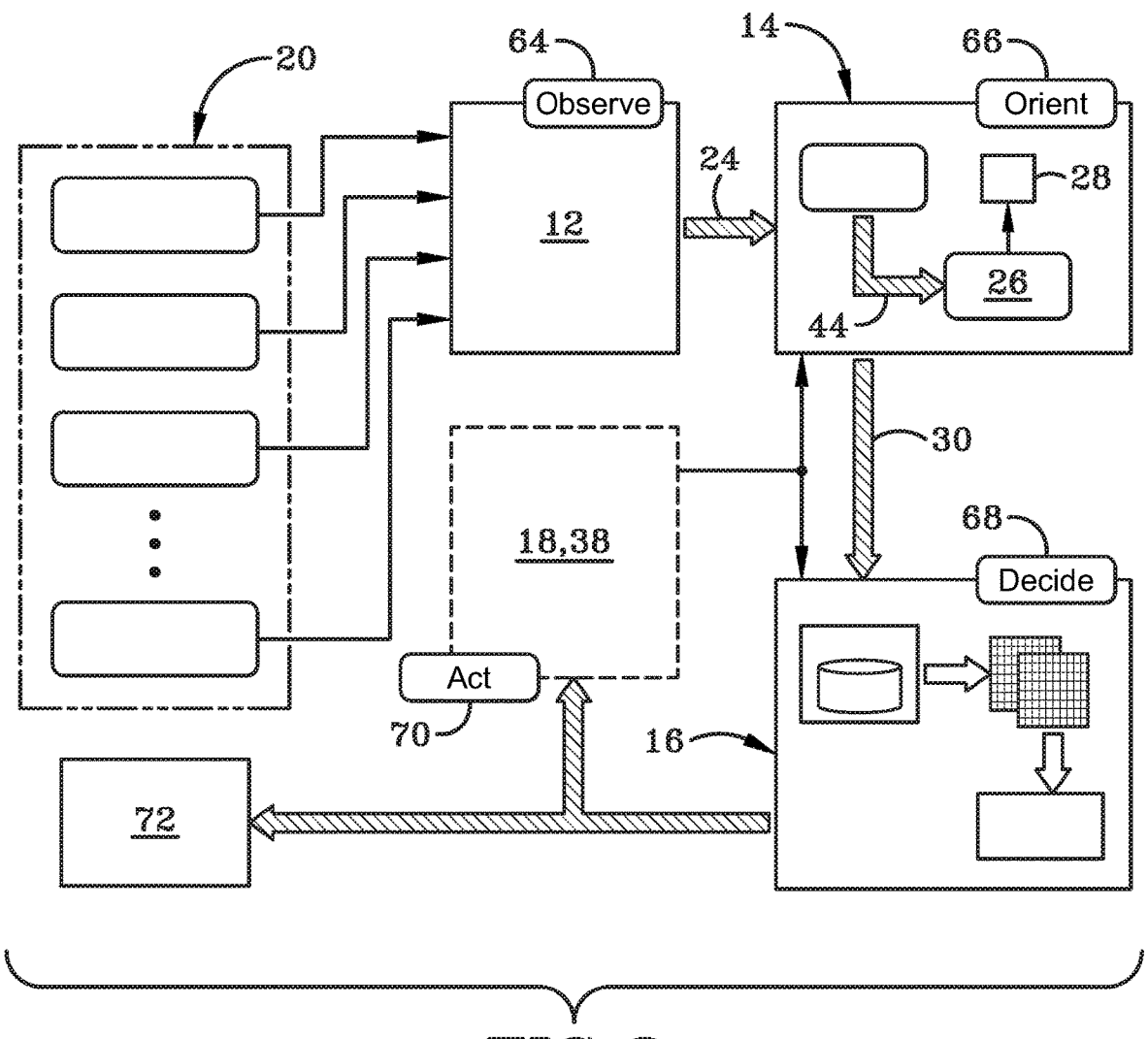
FIG. 3 (FIG. 3) is another diagrammatic view of the architecture of the autonomous decision maker for improved network resilience.

FIG. 3 depicts ADMIN system 10 as a four-stage architecture utilizing an OODA loop (Observe, Orient, Decide, and Act). As detailed in TABLE 1 (below), the sensor ingestion framework 12 performs the observe function 64. The network analyzer 14 performs the orient function 66. The Simulator 16 performs the decide function 68. The feedback 18, specifically the Q-Learning 38, performs the Act function 70. The feedback may be reviewed by human operator 72, or as detailed below, the system may take its own action to remove or hindered a detected or suspected threat.

Figure 4:
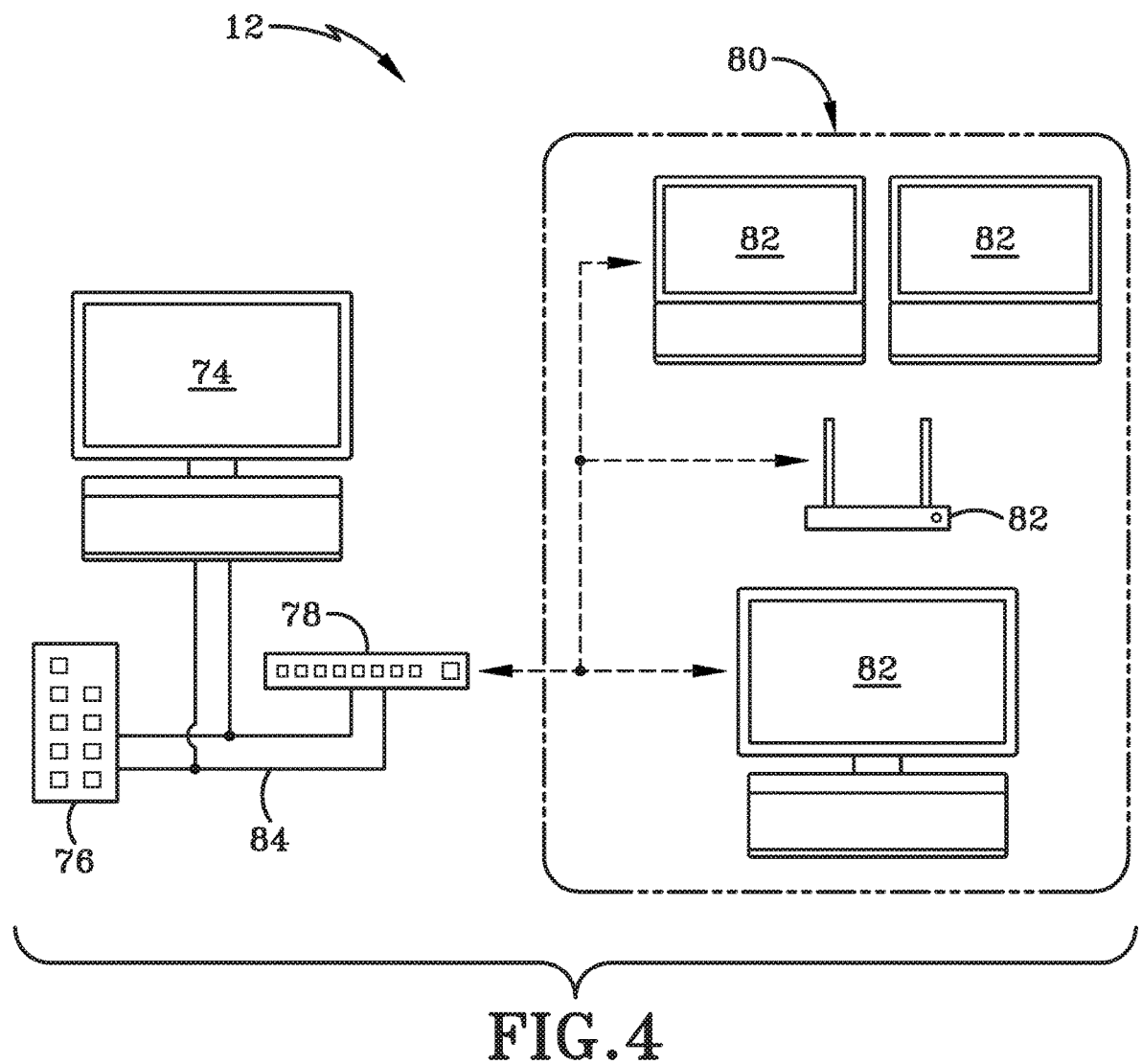
FIG. 4 (FIG. 4) is a diagrammatic view of the architecture of a sensor ingestion framework in the autonomous decision maker for improved network resilience.

FIG. 4 depicts a schematic of the sensor ingestion framework 12 including a monitor node 74, a firewall router switch 76, a switch 78, and a network 80 formed from a plurality of networked nodes 82 that are monitored by the monitor node 74. Monitor node 74 is coupled with switch 78 via link 84 that may include a LAN Tap 86 between the monitor node 74 and the switch 78. Switch 78 is coupled with network 80 and permits network activity of nodes 82 to pass through switch 78 along link 84 to monitor node 74. As will be described in greater detail below, monitor node 74 runs and executes the various anomaly detectors and sensors, namely the IDS tools 22.

Figure 5:
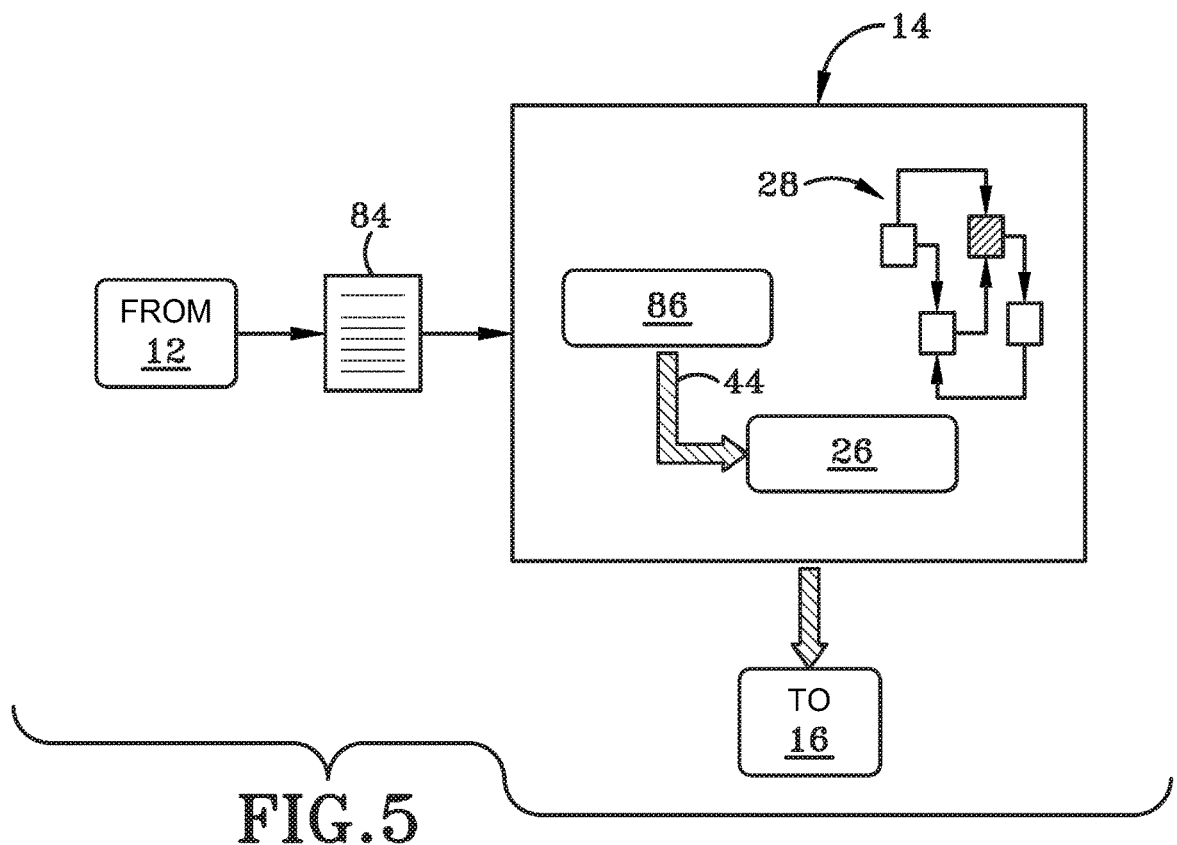
FIG. 5 (FIG. 5) is a diagrammatic view of the architecture of a network analyzer in the autonomous decision maker for improved network resilience.

FIG. 5 depicts a schematic view of the network analyzer 14 receiving anomaly reports from the sensor ingestion framework 12. Analyzer 14 has an alert correlator and aggregator 86 that performs an alert correlation and aggregation function. Aggregator 86 is linked, vial link 44, with the ALPHALADS and POMPDP 26.

Figure 6:
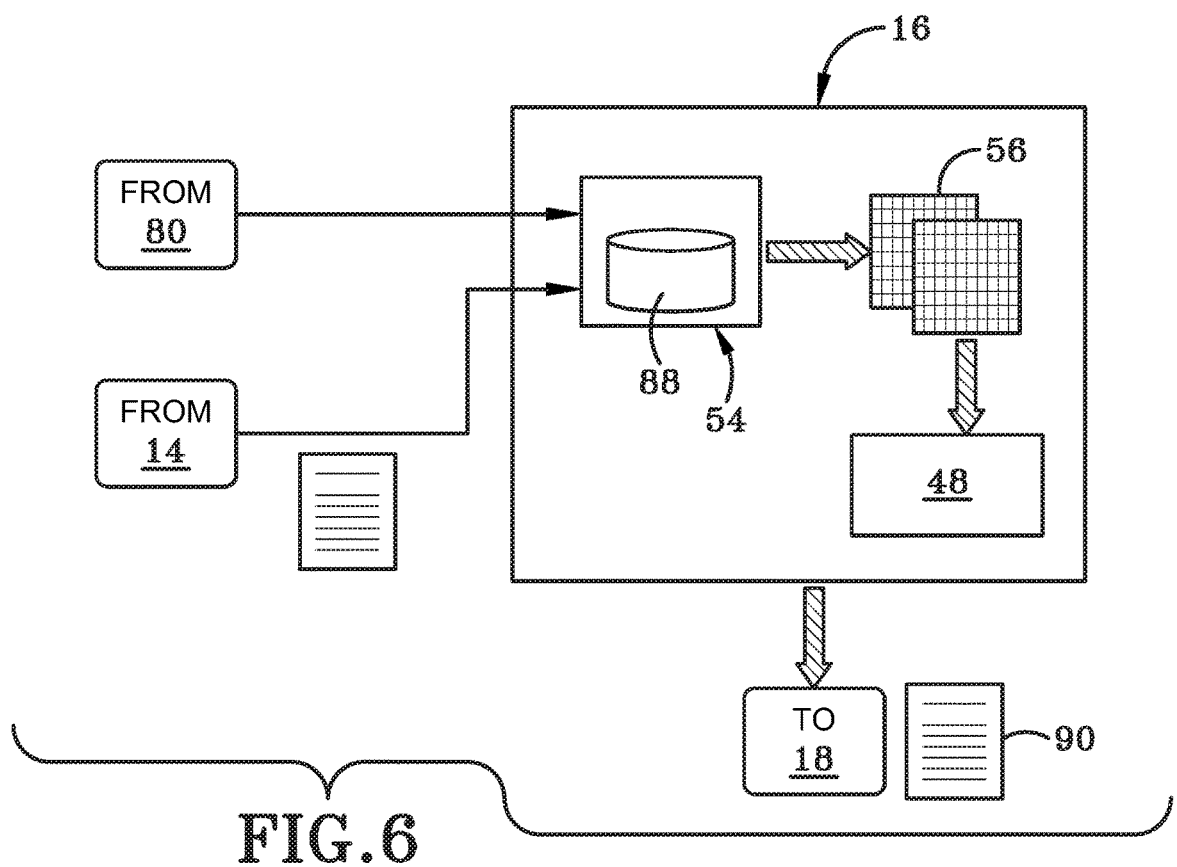
FIG. 6 (FIG. 6) is a diagrammatic view of the architecture of Course of Action Simulator in the autonomous decision maker for improved network resilience.

FIG. 6 depicts a schematic view of the CoA simulator 16 having the traffic modeler 54 and the decision engine 48. Traffic modeler 54 includes a CLIPS Rules-based engine 88. Traffic modeler 54 having the CLIPS Rules-based engine 88 may suggest corrective actions to take when the network analyzer 14 warns that the network 80 is under attack or suspected of being attacked. These rules encode the network operator's default policies, goals and strategies. CLIPS is a development toolkit that provides a complete environment for the construction of rule-based and/or object-based expert systems. CLIPS represents knowledge as facts and rules, and supports rule-based and procedural programming. Rule-based programming allows knowledge to be represented as heuristics or "rules of thumb." Each rule specifies a set of actions to be performed for a given situation. CoA simulator 16 may output ranked decisions and provide a prediction of expected changes in future performance, which is shown generally at 90.

With continued reference to FIGS. 1-7, the architecture of ADMIN system 10 proposed architecture will include, amongst other things, (1) ALPHALADS-based POMDP 26 to correlate events from sensor 20 inputs with system states; and (2) the CoA simulator 16 that uses the traffic modeler 54 and decision engine 48 to model traffic flows and find a sequence of actions which will help humans (or automatically/autonomically) return the system state to acceptable security and performance levels.

ADMIN system 10 may operate with an existing suite of anomaly sensors 20 to build models of normal network behaviors based, at least in part, on offline and online observations. Sensors to be integrated include Snort, Bro, and legacy network anomaly sensors 20 developed on network anomaly detection (ONDEC) framework (i.e., DNS and HTTP). The ADMIN system 10 may be integrated by using legacy or existing modular ONDEC framework, or another type of framework. After sufficient training, the anomaly detectors/sensors 20 alerts should be organized by the POMDP 26 to model the likelihoods of certain anomalies being associated with specific states, allowing ADMIN system 10 to prioritize whether a threat to network 80 should be tracked further, a specific action should be taken (such as shaping network traffic or blocking the node entirely), or a behavior should be ignored. When the POMDP 26 detects that the system has entered an unsafe state, it will warn the CoA simulator 16 and suggest an initial remedy. The CoA simulator 16 may perform further analysis and suggest corrective actions.

The CoA simulator 16 may consult its rules-based engine to decide the best response and uses a traffic modeler 54 to predict potential future network states. The CoA simulator 16 may incorporate a custom-built packet/flow-level simulator (i.e., decision engine 48) to simulate and may estimate the effects of feasible and available actions. The current network state should change based on the simulated action. By comparing the result of the last action with experience impact, Q-Learning 38 may enable ADMIN system 10 to improve autonomic decision-making capabilities over time. Initially ADMIN system 10 will model and support corrective actions such as blocking an IP address or port, shaping traffic, and redirecting traffic to honeypots.

Having thus generally described above the architecture of ADMIN system 10, reference is now made to its operation and some non-limiting examples thereof. Accordingly, the present disclosure relates to methods and processes for constructing an automated or autonomous system. Particularly, the present disclosure provides methods of operations for an autonomic system for network defense.

In accordance with one aspect of the present disclosure, the automatic decision engine 48 and the traffic model simulator (i.e., modeler 54) cooperate with a POMDP 26 and the anomaly detectors/sensors 20. The system 10 of the present disclosure may run or execute a number of simulations in parallel that provide multiple outcomes to make a prediction from the CoA simulator 16 of what the network 80 behavior will be at a point later in time if an action is taken (such as blocking a threat to the network, or shaping network traffic). Then, using the feedback of whether that action actually happens to train the system while it is working to determine whether the system is performing optimally to make correct predictions. Thus, in one particular embodiment, the system may generally be considered a feedback control system combined with a simulator with an anomaly detector. This is an improvement over conventional anomaly detectors that simple recognize anomalies and then require a human operator to determine whether they are creditable.

In accordance with another aspect of the present disclosure, the system 10 does not need to eliminate every single threat. For example, if the ADMIN system 10 determines that a threat is potentially creditable, it may significantly reduce bandwidth to slow the exchange of information across a communication link (i.e., shape network traffic). For example, if a communication link is normally 100 megabits per second and the decision engine 48 determines that it might be a threat, the system 10 can significantly reduce bandwidth across that single link between nodes 82 in network 80 to slow the exchange of information down to about 1 megabit per second. Stated otherwise, system 10 may shape network traffic by slowing network traffic through a switch or link down in response to a threat. In one particular embodiment the traffic shaping occurs by slowing down the network traffic on the order of 10, 20, 30, 40, 50, or 100 fold or more. Thus, the system of the present disclosure is able to perform traffic shaping across communication links between nodes 82 in network 80. This is an advancement over a simple binary decision as to whether to permit or block a communication link in response to the detection of an anomaly.

ADMIN system 10 of the present disclosure is configured to predict in advance or otherwise look ahead to solve for anomalies between nodes 82 in network 80 in advance that were heretofore unknown to an anomaly detector. Thus, the present disclosure is configured to address unknown anomalies between nodes 82 in network 80 or unknown anomalies of other network 80 behavior. An anomaly in one particular example may refer to a statistical description of network 80 traffic that may be outside the normal behavior of the network. For example, consider a business that operates on network 80 and has normal network traffic (i.e., node-to-node communications) during the week during normal business hours and has typically little to no traffic across the network on the weekends because its employees are at home and not working. If the CoA simulator 16, and more particularly the decision engine 48, determines that there is a high traffic of network activity over the weekend, then this could qualify as an anomaly. This would be considered a volumetric anomaly based on the volume of network activity occurring outside of the normal (i.e., learned by the system 10) network activity (i.e., normal business hours during the week). There may also be anomalies based on patterns of network activity. For example, consider a first employee and a second employee normally communicate at a given time during the week. If the CoA simulator 16, and more particularly the decision engine 48, determines that during that same time on a given week fifteen other accounts (or another high number of accounts) of the network 80 attempt to connect, then this may be considered a pattern anomaly as it is outside the normal scope of network activity or network pattern activity.

ADMIN system 10 may operate to shut down a link as a result of the anomaly (described in the examples above)

based on behaviors that may occur up to 10 minutes in advance in about 30 seconds of processing time. Based on these results, the system can determine whether to shape traffic in a shaper or whether to block the anomalous activity completely. In addition to network traffic shaping, there are other disruptive techniques that can help block a potential threat to the network 80. For example, the system 10 may drop one packet of information exchanged across the communication link between nodes 82 in network 80. For example, if the threat is trying to communicate ten packets of information across the link, the decision-maker may purposely drop one or more of the packets, such as the third packet (or more packets), of information. This could be advantageous because if a threat, such as an external hacker were trying to receive information through the communication link, the threat would not receive every packet of information but could disrupt the operation of the threat trying to hack into the network 80. However, in the event that the anomaly was not actually a threat, the node 82 receiving the incomplete packet set would recognize the incomplete packet set and could consult the network administrator to request the packets be resent. ADMIN system 10 could learn that the anomaly was not a threat and, via feedback 18 and Q-learning 38, determine that this activity may continue in the future. Furthermore, if the system 10 drops a packet of information that a hacker was trying to access in network 18, it is unlikely that the hacker will reaching out to the network administrator and ask them to resend the link because their identify would be more likely to become known.

In accordance with another aspect of the present disclosure, the system provides a network security device that works on the network 80 level and not the host level. Stated otherwise, the security provided by the device is on the network 80 traffic level in terms of action statements. This is in contradistinction with conventional security software, which work on the host level. The automated decision engine 48 works on network level traffic and may focus on the gateway that allows traffic into or out of the network 80. However, the system may be applied to traffic within a network. An example of an anomaly inside the network refers to when a corporate office has a laptop node and there is another laptop node that do not typically communicate. Thus, any network traffic that goes from the first laptop node to the second laptop node may be an anomaly that needs to be blocked, studied, or quarantined at the network level.

The automated decision engine 48 is a rule-based engine that may be considered an expert system, including a set of rules that include probability ratings to rank the anomalies that have been detected. In one particular embodiment, the rule-based engine may determine, based on the rules, how to steer or eliminate or shape traffic across the communication link in response to the detected anomaly. The automated decision engine may rank the options of outcomes based on the detected anomaly. For example, a first option may result in increased cost for the operator. A second option may reduce traffic for a number of hosts by a certain percentage. In this example, if the adversary information is slowed (i.e., shape traffic to slow the threat), there may be other non-adversarial communications that need to occur on a similar link that would be harmed because of the detected anomaly. Thus, the present disclosure provides a simulation in addition to analysis of what will occur as a result of the decision made by the automatic decision engine.

In one particular embodiment, the system is an active system that is responsive to detected anomaly. Thus, when an anomaly is detected, the anomaly pattern may be added to the modeler 54 in order to run a simulation so that the automated decision-maker 48 can determine what steps to take to address the anomaly. The detected anomalies via sensors 20 drive the modeler 54 and the decision engine 48 reads the outputs of the simulator to make a report. Once the report is generated, there is choice to take the top ranked action or do nothing. Alternatively, the report may be provided to the human administrator to execute the options that are provided as a result or provided from the automated decision engine. This enables the automated decision engine 48 to recommend a course of action (COA) which typically may be taken a single COA at a time. However, there may be instances where there are three COAs operable at the same time, which may be orthogonal to each other. The decision engine 48 may be responsible for providing a ranking of the predicted decisions that will result in response to the action that is taken. The system can employ a quantitative metric to improve the ranking of the decisions. In one particular embodiment, based on the ranking, the automated decision engine may take a corrective action based on the quantitative metrics. Then the system may correct itself in the event the decision was incorrect and it can learn from the incorrect decision to determine whether that action should be taken again. For example, feedback is provided from network 80 activity that is occurring that is outside the normal course of network activity then the automated decision engine 48 may shape the network traffic or eliminate this traffic by shutting down the gateway. Then, the next time a simulation is performed and that same network that originally generated the anomaly is no longer occurring, the system can reevaluate based on the feedback to determine that the anomaly has been eliminated and the decision was correct. Thus, the decision engine can continue to operate that the decision was a success until and unless a network administrator tells the automated decision engine that the decision was incorrect.

In operation and with reference to FIG. 1, ADMIN system 10 of the present disclosure may use POMDP 26 to aggregate and correlate network and host sensor outputs to detect system and network-level event states. These states provide context to determine when a decision needs to be made and what actions can be taken (such as traffic blocking or traffic shaping, detailed supra). POMDPs 26 are well suited to this specific problem domain, because they can be used to make inferences about the otherwise unobservable state of a complex system given only external emissions and measurements (observations). Further, POMDPs 26 can be used to compute optimal time-weighted responses according to the inferred states.

Regarding the CoA simulator 16, the system of the present disclosure may quantitatively and qualitatively evaluate different actions in an automated manner using parallel simulations to rank the suggested Course of Action options. These simulators allow the system 10 of the present disclosure (i.e., ADMIN) to run and merge multiple high-fidelity look-ahead simulations to quantify the cost/benefit analysis of potential autonomic decisions.

Regarding training and experimental feedback 18, the system 10 of the present disclosure may account for the network 80 environment, traffic loads and adversarial tactics that may change over time. Thus, ADMIN system 10 analysis and decision models and corrective actions might need tuning and adjustments. To automatically address this drift and improve accuracy of CoA recommendations, the system 10 of the present disclosure may add online feedback 18 mechanisms. Based on actual performance measures, the system of the present disclosure may improve CoA generation by using reinforcement algorithms or processes (such as Q-learning 38) to adapt the POMDP 26 and simulation models. The present disclosure may differ from support vector machine learning techniques because newer artificial intelligence (AI) techniques (e.g., Q-Learning 38) can learn new adversarial patterns and take exploratory decisions, and have the ability to learn from mistakes.

Generally, the system 10 of the present disclosure may be a modular autonomic decision system for active network defense that combines advances in machine learning with CoA evaluation. The system 20 of the present disclosure may focus on developing a solution suitable for near-term semi-autonomic defense (i.e., operator-in-the-loop) as well as future fully-autonomic operations (i.e., operator-out-of-the-loop). In one particular embodiment, the primary output of the system 10 of the present disclosure may be a ranked list of CoA suggestions (i.e., decision list 90) and impact predictions for the operator to manually consider in semi-autonomic mode. If configured in full autonomic mode, ADMIN system 10 may directly select and then execute recommended CoA events without human intervention for faster response.

In operation and with reference to FIG. 2, ADMIN system 10 may work with an existing suite of reputation based, statistical, DNS, and HTTP network anomaly detectors or other similar sensors 20 to build models of normal network 80 behaviors based on offline and online observations of traffic through a gateway in the network to the remaining world wide web or of traffic occurring locally on network 80. ADMIN system 10 may reuse existing modular ONDEC framework allowing new/future detectors 20 to be added such as snort and bro in later stages. After sufficient training, the anomaly detector 20 alerts may be organized by the POMDP 26 to model the likelihoods of certain anomalies being associated with specific states, allowing ADMIN system 10 to prioritize whether a threat should be tracked further, a specific action should be taken, or a behavior should be ignored and treated as "normal". When the POMDP 26 detects that the system has entered an unsafe state, the decision engine 48 may perform further analysis.

The decision engine 48 consults the traffic modeler 54 evolves the operational traffic model(s) based on continuously observed traffic in network 80. Traffic models may be represented as matrices of traffic load and connectivity. Traffic Models may be built by observing network traffic, and are separated into short term and long term models. In addition, the decision engine 48 may store archived models of normal traffic. Once activated by the POMDP 26, the decision engine 48 may use a packet/flow-level simulator to simulate and estimate the effects of feasible and available actions. The current traffic model may change based on the simulated action. By comparing the current model's distance to archived models, ADMIN system 10 simulates the performance improvement of a specific action. Through multi-action modeling, the decision engine 48 may result in a sequence of actions that will remove the anomalous activity and return traffic to a normal or recovering state. Initial support for actions will include items such as blocking an IP address or port, shaping traffic, and blocking or moving services.

Regarding statistical anomaly detection via detectors 20 depicted in FIG. 2, ADMIN system 10 may detect network anomalies and attacks in network traffic. ADMIN system 10 may be sensor-agnostic and the network analysis may integrate with two widely used existing IDS tools 22 (Snort and Bro) that are open source.

Regarding traffic model simulation via modeler 54 depicted in FIG. 2, ADMIN system 10 may quantitatively and qualitatively evaluate different actions in an automated manner. Modern simulators, such as ns3, can provide high fidelity predictions of future network state for large-scale networks in the order of seconds, thus enabling potential complex CoA decisions to be evaluated every 5 minutes or every minute or at another time interval.

Regarding reinforcement and self-training mechanisms depicted in FIG. 2, ADMIN system 10 uses online feedback mechanisms to improve network analysis and CoA decision-making accuracy by using reinforcement process, techniques, or algorithms (i.e., Q-learning). Thus, ADMIN system 10 may explore new corrective actions, and learn from its past success and failures on its own.

In operation and with reference to FIG. 3, the ADMIN system can apply a semi-closed Observe Orient Decide Act (OODA) loop (See Table 1). Each step in the OODA loop maps directly into a functional component in the ADMIN Architecture described in greater detail below in Table 1.

TABLE 1

| State | Relevance | Portion of ADMIN System 10 |
| --- | --- | --- |
| Observe 64 | ADMIN System 10 uses its sensor suite of traffic monitors to observe and build snapshots of the network state over multiple timescales from multiple alerts. | Sensor Ingestion Framework 12 |
| Orient 66 | ADMIN System 10 algorithms and processes (such as POMDPS 26) analyze the current state of the network by comparing it against historical and statistical models and out-of-band information such as threat level, network policy, performance goals and mission objectives. | Network Analyzer 14 |
| Decide 68 | Once an anomaly or threat has been detected or suspected, ADMIN System 10 will explore the search space of available Course of Actions (CoA) via parallel network simulations 32 to estimate and rank the best choices. | CoA Simulator 16 |
| Act 70 | ADMIN system 10 will suggest actions to human analysts, or directly implement the highest ranked option (or set of combined actions). Decisions made by ADMIN system 10 can be tuned, adjusted, or overridden by the human administrators, if needed. ADMIN system 10 may also apply Q-Learning to train itself from experiences and operate fully autonomically. | Feedback 18, specifically, the Online training via Q-Learning 38 |

One exemplary output of ADMIN system 10 presented to the operator for review and consideration is the Course of Action (CoA) and a corresponding predicted estimate of what the future state of the network will be after a finite time period (e.g., 1 minute, 2 minutes, 3 minutes, 5 minutes, 10 minutes, or more). In full autonomic mode, once ADMIN system 10 decides the CoA, ADMIN system 10 may bypass operator review and automatically apply the actions (e.g., block a port, block a gateway, shape traffic to node Y, sinkhole all traffic from node X (i.e., one node 82)).

Since the ADMIN system 10 simulator also predicts future performance, after the prediction time horizon has passed (e.g., 10 minutes later), ADMIN system can compare the prediction of the simulator for that action against (i.e., versus) the actual state of the current network. Then, ADMIN system may evaluate the quality and accuracy of the suggested CoA.

In one exemplary embodiment, ADMIN system 10 provides a unified combination of sensor alert processing, state estimation, and CoA selection that may increase the cyber analyst's efficiency and accuracy. ADMIN system 10 may help network operators react to threats more quickly, identify threats they may have overlooked, and help them better understand the impact of different options at their disposal. In addition, ADMIN system 10 may also improve the network operator's ability to respond automatically to simple known threats. ADMIN system 10 may train itself against new threats, while a human supervisor can still help tune or correct ADMIN system 10 performance as needed in either mode.

For fully autonomic defense, ADMIN system 10 has administrative control and may be empowered to apply a broad set of corrective actions autonomously. As a more intermediate goal, ADMIN system 10 can initially suggest ranked decisions with risk assessments and provide them to a human operator/analyst in a simple GUI. The analyst and network operators then decide whether to implement the suggested action.

ADMIN system 10 may provide initial actions that may be relatively simple such as "Block all out-bound traffic from node Y to node X" or "Redirect all traffic from Z to honeypot" or "Observe node X for next 30 minutes" and may also support a broader set of actions including traffic shaping and port blocking.

Regarding machine learning and expert systems, ADMIN system 10 may use a suite of machine learning tools, such as the POMDP 26 engine ALPHALADS and the CLIPS rule-based database 88 system. ADMIN system 10 may aggregate and correlate sensor outputs to detect system and network-level event states. These states provide context to determine when a decision needs to be made. In one particular embodiment, POMDPs 26 are well suited to this specific problem domain, because they provide viable policies for selecting automated actions in a system, even when the underlying system state cannot directly or completely be observed. The POMDP 26 may combine inputs from existing intrusion detection system (IDS) tools 22, such as Snort and Bro, and other IDS sensors to develop the context necessary for autonomic and semi-autonomic defense.

In operation and with reference to FIG. 4 regarding sensor ingestion framework 12 of ADMIN system 10, to collect cyber alerts across a broad-spectrum of potential sensors (i.e., the Observe 64 step (FIG. 3)), the sensor integration framework 12 provides a common integration platform and alert applicant program interface (API). This allows downstream components to benefit from new sensor types with minimal engineering. Moreover, this framework provides the common infrastructure for integrating the three components listed below. ADMIN system 10 leverages infrastructure to provide an early foundation for subsequent innovations.

The sensor ingestion framework allows ADMIN system 10 to integrate ONDEC framework and add support alerts from Bro and Snort in a common anomaly alert format. The ONDEC Sensor System may include one or more, such as a group of, ONDEC Sensors 20 (FIG. 2) working together to analyze network activities by passive traffic analysis on network 80. This distributed network of ONDEC Sensors cooperates by sharing Anomaly Events (across a shared communication bus 60 (FIG. 2)) to enable advanced correlation performance in the overall ONDEC intrusion prevention system. ONDEC uses anomaly detection, rather than more commonly used signature-based detection, to search for new threats on a network and thus complements the capabilities of other tools. In one particular embodiment, the ONDEC sensor system uses stochastic analysis, trend analysis, and other decision techniques to determine when abnormal behavior occurs. The output of the senor ingestion framework is a stream of anomaly reports in a common shared format sent to the network analysis unit for processing.

The preliminary anomaly sensor 20 set for ADMIN system 10 may include DNS and HTTP sensors. These sensors 20 may monitor their respective traffic types for protocol anomalies, behavioral anomalies, and statistical anomalies. In one particular embodiment, these sensor types are beneficial as a large class of modern exploits target end users' browsing activity or attack web-servers. Web-based exploits can be delivered to a target organization at very low costs, while DNS is a service web users rely on extensively.

With continued reference to FIG. 4 regarding network 80 analysis via analyzer 14, a functional element is responsible for inferring system state (the Orient 66 step), from the alert stream. ADMIN system 10 leverages the POMDP 26 to identify the most probable current state of the network and to suggest the corresponding corrective course of action.

In operation and with reference to FIG. 5, as noted previously, modern sensors produce a high-volume stream that is difficult for the analyst to review thoroughly. Furthermore, alert reports are indirect indicators of a threat—observing only a single characteristic of anomalies such as unusual network access or system call. To be actionable by the analyst, alert reports must be coalesced into an accurate estimate of the current network conditions.

The present disclosure may replace a previously manual chain of decision-making processes, such as what was implemented in the target example, with an autonomic decision-making system. The present disclosure develops a list of choices (i.e., decision list 90) for selections for a human administrator to evaluate and rank them in a hierarchy based on threat levels and can even eliminate the human operator by making the decision to determine the threat level or threat credibility without the need of the human decision.

FIG. 5 depicts that the network analyzer 14 of ADMIN system 10 examines the stream of alert reports and estimates the likelihood that the network conditions align with a finite set of ADMIN-defined network states and suggests a corrective action based on the current state. The output of this Network Analysis unit is fed into the Course of Action (CoA) engine. In one particular embodiment, the network analyzer 14 suggests actions that will be ranked and evaluated by the CoA simulator 16.

In one particular embodiment, before ADMIN system 10 can recommend a corrective action, ADMIN system 10 should determine its current state based on measured behaviors and information from anomaly alerts. ADMIN system 10 may also formally define the set of states the network can be in at any time.

ADMIN system 10 initial network states may be based on the cyber security "kill chain" concept. Per the kill chain, when a network (or corresponding node, router or host within the network) transitions from a normal non-attack state to coming under attack, it may enter one of three threat states: Pre-compromise, Compromise and Post-Compromise. The Pre-compromise state is characterized by reconnaissance steps such as probing and scanning of specific target nodes, followed by actual delivery of a payload such as an overflow exploit during the Compromise phase followed by data exfiltration or other malicious behavior in the Post-Compromise. The ADMIN system 10 approach to network analysis quantifies the state (e.g., Pre-Compromise, Compromised, Post-Compromised) of each node, network element and thus, should improve overall network health.

ADMIN system 10 and its network analysis processing chain may include two components: 1. Alert Report Preconditioning: Before any analysis occurs on the reports, the network analysis unit filters out duplicate reports across the sensor set. This may ensure that redundant sensor coverage of the attack space does not artificially reinforce a false model of the current state. ADMIN system 10 accomplishes this preconditioning by aggregating similar alerts and filtering them based on period of arrival, frequency and other shared fields. 2. State Estimation using Partially Observable Markov Decision Process (POMDP): Because the true latent network states (and corresponding state of individual hosts) are not directly measurable, techniques are required to estimate the current state from available observations. POMDP provides a formalized methodology for analyzing and adapting the network state over time by inferring the time-weighted most-likely current state given past observations. The benefit of the POMDP model is that the Markov model intrinsically encodes the history of prior observations and state estimates with the current model of the system. The Markov dependency assumption reduces modeling complexity and allows it to operate near line speeds. Markov decision processes (MDPs) or partially observable MDPs (POMDPs) are well-suited for inferring the current network state from noisy alerts; and then deciding corrective actions to take via sequential decision making techniques.

When network 80 is under attack, it results in a change of network state from the analyzer 14 perspective. Given an attacker's action, the probability of transiting from one state to another is modeled by a finite Markov process. That is, for every action there is a Markov chain labeled by that action that quantifies the state transition probabilities resulting from that action. Depending on the specific action (or reaction) taken and the current state, there are costs (and reward) functions, incurred by the attacker and defender respectively. Such a modeling formalism is called a Markov Decision Process (MDP).

While MDPs provide the basic modeling formalism, at any given time, a defender typically does not know what state they are in (i.e., the states are not directly observable). The defender (i.e., ADMIN system 10) may not know what offensive tactics have already been deployed and how many of defensive protections have been defeated or bypassed. ADMIN system 10, however, has access to certain observations (such as knowledge from our sensors and alerts), which can be used to create a stochastic function of the last action taken and the current state occupied. MDP's in which states are not directly observable (i.e., hidden states) can be modeled as POMDPs.

The POMDP response selection is designed to trade off the cost of mission disruptions vs. impacts of adversary-caused degradation on a per state basis. This is done using the techniques of optimal stochastic control, with numerical models computed at design time in the laboratory.

ADMIN system 10 may provide model databases with numerical values to estimate the initial state transition probabilities and sensor observation probabilities, which depend upon the nature of the sensor alerts ingested. Transition probabilities and observation probabilities can be empirically approximated from laboratory analysis during the course of the program using a CyberNet test bed. Local state estimators $\varphi(\cdot)$ may use local platform sensor data Z and information K stored in a local model database to recursively update probabilistic estimates B of the local state. Local estimators also consider wide-area situational awareness information $B_{ndc}$ from additional sensors. The local model database contains probabilistic models, previous state estimates, and any response countermeasures previously employed. Estimators produce platform state estimates by carrying out the computation $B=\varphi(Z\ K,\ B_{ndc})$.

The estimated current local network state may be a combination of the network's mission operating mode and system-under-attack state. The local platform state may be modeled as discrete operating modes $\{OM1, \ldots, OMm\}$ such as those described in the cyber kill chain. Attack states may be represented as a sequence of transitions characterizing the evolution of the attack over time. The initial starting state is N for "Normal". This state transitions to any of several ongoing attack states, leading to either a compromised or protected "Final" state ($F_c$ or $F_p$). Thus the system state X may be contained in the space of possibilities $S=\{OM1, \ldots, OMm\} \times \{N, A1, A2, A3, \ldots, F_c, F_p\}$. Attack states may be characterized by generic prototypes of adversary activity, not all of which will be observable. For worms, these states may include probes, exploitation, download, installation, payload execution and propagation. For example the initial observation state A1 might represent actively scanning the TCP port of a platform, or might represent passive monitoring of network traffic.

The ADMIN system 10 having the POMDP 26 builds upon a stochastic correlation engine, namely Alpha Lightweight Autonomic Defense System (ALPHALADS). ALPHALADS correlates alerts coming from network-focused and host-focused anomaly sensors 20 to take autonomic action to halt the propagation of worm attacks. In one particular example, ALPHALADS detected, contained and recovered from a broad range of third-party zero-day worm attacks, with low false-action rates. In another particular example, ALPHALADS stopped 30 of 30 known worms, 60 of 60 unknown worms (four after host infected, but be-fore propagation), and 89 of 90 stealthy (no scan) worms (four after host infected, but before propagation, one attack succeeded). In independent validations, we stopped five of five attacks. ADMIN system 10 builds on ALPHALADS by detecting and correlating multiple attacks, in a multi-layer hierarchy.

The outputs of network analyzer 14 are the estimate of current state and suggested corrective actions (or CoA) that are passed into the CoA simulator 16 discussed in further detailed below.

In operation and with reference to FIG. 6 and regarding the CoA simulator 16, the CoA simulator 16 is responsible for deciding the best actions (the Decide step 68 (FIG. 2)), that are appropriate for the given state of the network. The CoA simulator 16 estimates the quantitative impact of those decisions on the future state of the network 80. The ranked list of CoA decisions 90 suggested by the simulator may be vetted by a human operator who will decide if and when to apply them on a live network.

The CoA simulator 16 may take the aggregate network state information and suggested corrective actions from the network analyzer 14, evaluates their impact, and evaluates the risk versus reward tradeoffs of applying the suggested actions to mitigate current threats.

In accordance with one aspect of the present disclosure the CoA simulator 16 should (i) determine if the reported anomalous behavior on the monitor network 80 is objectively bad and causing immediate harm; (ii) decide what course of action (or set of actions) to take; and (iii) evaluate the future impact of applying corrective recommendations.

In one embodiment, (i.e., the manual embodiment) the CoA simulator's output ranking of actions or decision list 90 may be presented to the cyber analyst who decides which if any of these actions should be applied on the real network.

In another embodiment, namely full autonomic mode, a selected CoA from the decision list 90 will be directly applied to the network 80.

Returning, to the Target® retailer intrusion example, if the Target® retailer network was defended by ADMIN system 10, then the output of simulator 16 would help operators see new insights, such as that by blocking outbound traffic by FTP to suspicious node X, only 10% of critical high priority FTP flows sharing that application and node will be affected. Another analysis might show that by shaping traffic to 50% current rate, an adversary would need twelve days to download the whole database and not impact any safe high priority FTP flows.

With continued reference to FIG. 6, the CoA simulator 16 may use the output of the network analyzer 14 along with a detailed summary of the current network 80 traffic pattern. This traffic summary across network 80 describes which nodes 82 is/may be sending what information and how much traffic to whom collected from passive network analysis. As described earlier, the network analyzer 14 describes estimates of current state and a suggested actions to test (i.e., output of the POMDP 26).

The CoA simulator 16 may include two subcomponents: traffic modeler 54 and decision engine 48 (again, which could also be referred to as the network simulator 48). The network simulator 48 helps estimate future impact on the network of applying the suggested action. In one embodiment, the traffic modeler 54 applies model-based reasoning via a rule-based engine, such as CLIPS Rules database 88, to analyze the severity of suspected adversarial behavior. The traffic modeler 54 in the CoA simulator 16 compares information about the current state of the network 80 against a list of rules and policies, and then suggests what action to take in different situations. For example, a single node pinging a server with large payloads once an hour does not merit a response, but 500 nodes doing the same in 1 minute, requires immediate attention.

The CoA simulator 16 may use templates for building new facts. Each incoming alert may be transformed into a fact and these facts may trigger rules. When a rule is triggered, a specified action occurs. For example, when the number of alerts with the same node or anomaly ID reaches a specified threshold, CLIPS will look up its predefined rules to suggest one or more corrective action based on information about the state of the network and other facts. The output of the traffic modeler 54 may be the candidate list of recommended corrective actions that are fed into the network simulator 48 for impact evaluation.

One exemplary goal of the network simulator 48 may be to provide quantifiable evidence that applying our suggested corrective actions may address the suspected attack, and to estimate how performance may change for individual nodes and applications immediately and in the near future. Certain actions may reduce performance and this component will quantify the tradeoffs and risks involved. The idealized output of the Simulator 48 is a ranked list of corrective action options (i.e., decision list 90), along with future performance impact predictions and risks for each option (over suitable time horizons). For example, consider the following situation. If an operator were to "Reset the Virtual Machine" on a node now (corrective action), the operator would remove the malware exfiltrating data (immediate impact), but the operator would also impact the VOIP service for 5 minutes for 50% of all nodes currently because the primary VOIP server runs on that said node (risk). However, after 10 minutes, the traffic profile should return to normal (future impact).

Another exemplary goal of the CoA simulator 16 in ADMIN system 10 is to provide a look ahead into the possible future consequence on the network of each of the suggested CoA decisions. For example, some formulation of the network performance estimation problem that simulator 48 of ADMIN system 10 may solve include: (i) simulator Inputs: Source IP+Destination IP traffic flow pairs, flow priority, ports, durations, traffic volume, node and network health metrics, traffic class (elastic, inelastic, re-liable, unreliable); (ii) corrective actions to simulate and test: Examples: Block node X, Filter Traffic Y, Shape Traffic on port X by Y % for host/subnet Z for next t minutes; or (iii) simulator output: quantify performance impact to users and network if individual or collective actions are taken at different timescales such as after 5 minutes, 10 minutes, 30 minutes, 1 hour. Typical metrics used include network delivery ratio, network utility, latency, and uptime.

For each combination of inputs, a separate simulation may be run. ADMIN system 10 may run each simulation in parallel and exploit the parallelism provided by modern multi core CPUs. Longer simulation experiments should produce snapshots with intermediate results to minimize the risk of simulations running forever and failing to terminate.

There are tradeoffs between simulation fidelity, accuracy, speed and scalability. The simulator 48 should run fast enough before the network state being simulated changes significantly. If the simulation does not have sufficient fidelity or accuracy, its results may not provide a practically usable estimate.

One exemplary simulator 48 for the ADMIN system 10 is known as ns3, but with expanded capabilities able to calculate and estimate performance 10 minutes in the future in less than half a minute of simulator computation. However, other simulators are entirely possible. By running multiple simulations in parallel, based on prior experiences, the network simulator 48 can return its ranked list of CoA decisions (i.e., decision list 90) in one minute or less, with a look-ahead horizon of at least 10 minutes. The parameters for ranking the decision list 90 may vary depending on the desired outcomes of the operator of network 80. Alternatively, the decision list 90 does not need to be ranked.

The final output of the network simulator 48 and thus the entire CoA Simulator is the ranked list of recommended corrective actions (i.e., the decision list 90) that are provided to the network operator for manual review in ADMIN's semi-autonomic mode, or directly executed on the network in fully-autonomic mode.

Figure 7:
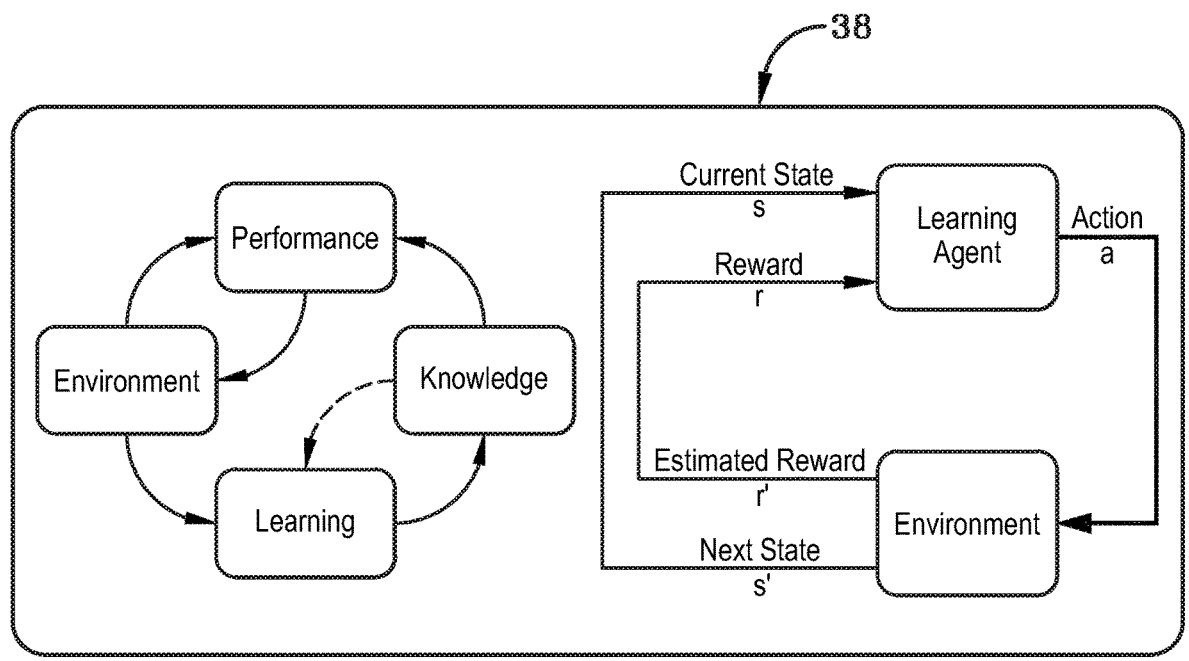
FIG. 7 (FIG. 7) is a diagrammatic overview of feedback and Q-learning utilized by the autonomous decision maker for improved network resilience.

In operation and with reference to FIG. 7 and with reference to online training via Q-Learning, the training and feedback unit 18 may implements (the Act step 70) an automated online reinforcement algorithm or process to enable ADMIN system 1 to adjust itself and improve its decisions over time, in a supervised or unsupervised manner. The ADMIN system 10 approach to online training via Q-learning 38 is to apply offline training to build the initial rules for the CoA and apply Q-Learning (a model-free reinforcement AI technique) to update rules based on experience gained by making exploratory decisions.

In one particular embodiment, a system that can reliably and accurately generate the output of the CoA Simulator 16 alone may be sufficient to develop a semi-autonomic network defense system. Success or failure of any such system in defending the network depends on the algorithms used and, in particular, the quality of the final CoA recommendations. To improve ADMIN system 10 performance, the feedback unit 18 via Q-Learning 38 trains the system 10 against new threats by tuning its rules and internal models.

The semi-autonomous mode of ADMIN system 10 may need a human operator to manually tune the rules engine manually based on their judgments and observations, similar to how an administrator tunes firewall rules and filters.

To develop an autonomous ADMIN system 10, the feedback mechanism of Q-Learning 38 may fully automate the process of tuning the rules that govern of our decision-making components. In one example, two areas that can benefit from tuning are the POMDP 26 model parameters and the rules encoded in the CoA simulator 16. Furthermore, automated tuning of the decision engine 48 (i.e., network simulator 48) may be possible as well.

Q-Learning is a model-free reinforcement-based machine learning and artificial intelligence (AI) algorithm that has shown success in several classes of autonomic exploratory decision problems (e.g., controlling robots in a new environment) that rely on environmental feedback.

In fully autonomic mode, ADMIN system 10 ranks its own decisions and immediately applies the corrective actions on the network 80. Note by this stage, ADMIN system 10 has run simulations and already estimated what the expected impact of applying that action will be. By using performance metrics to define future target goals, Q-Learning 38 may decide (and thus learn) if previous actions were correct or not. If ADMIN system 10 decides the reactions matched predictions, then ADMIN system 10 can apply the same approach in the future more frequently. If ADMIN system 10 decides they were incorrect, it can favor exploring alternate CoA options in similar attack-like situations.

A human supervisor can tune or correct performance as needed, but with successful application of Q-Learning 38, ADMIN system 10 should be able to train itself and adapt to changing adversary strategies and with few exceptions, eventually converge to optimal solutions.

With continued reference to FIG. 7 and the Q-Learning 38 algorithm or process, Q-Learning 38 may employ an exponentially weighted moving-average calculation to take note of recent policy success/failure as feedback, but may also take into account the weighted average of past values observed, referred to as Q-values. Q-value computation is iteratively performed via the equation:

$$[s',a']=(1-\alpha)\cdot Q[s,a]+\alpha\cdot r$$

Q[s,a] refers to the numerical Q-value (e.g., a floating point number) computed at a compound state 's' (FIG. 7) with a given action 'a' (FIG. 7) Parameter 'r' (FIG. 7) represents the instantaneous reward (or penalty) value which is derived from a measurement of the current environment based upon the current policy. The variable 'α' is referred to as the learning rate, or the weight assigned to the current observation, and ranges between 0 and 1. Q[s',a'] is the new iterative Q-value computed corresponding to the current action a' and the new resulting state s' (FIG. 7).

In one particular embodiment, Q-Learning 38 may be implemented as an external standalone training unit that interfaces with the network analyzer 14 and the CoA simulator 16. Given the similarities in the formulation of Q-Learning algorithm and the formalization of POMDPs, the system applies online training approach there first. Typically, POMDP models are trained offline, while Q-Learning enables online training of state-action pair models.

By measuring rewards (from environmental feedback) and comparing Q-values over time, the relative benefits of each policy decision may be evaluated and verified, and the decision policy (e.g., such as blocking a node versus filtering its traffic or ignoring it) is iteratively modified by the agent until a stable state maximal Q-value is reached. In simpler terms, real experience is used to guide future policy decisions (versus using pre-computed or stochastic models).

ADMIN system 10 may complement a Network Operation Center (NOC) that is typically staffed by cyber analysts and IT administrative teams. Today's NOCs use a broad set of commercial tools as illustrated. Their resultant output is a high volume of network alerts manually sorted by teams of analysts, often with the help of big data algorithms. For example, one exemplary NOC on average deals with approximately 14 million logged alerts per month.

ADMIN system 10 may integrate into a legacy NOC environment such that it can subscribe to the output of the various cyber sensors. In one particular example, ADMIN system 10 accesses at least some, but likely all, traffic headers via a network span port within the NOC.

ADMIN system 10 may be sensor-suite agnostic and vendor-neutral by design. ADMIN system 10 may integrate with commercial tools and other sensors of interest to the network operator through sensor ingestion frame-work. In one particular example, ADMIN system 10 does not develop new sensors. Instead, ADMIN system 10 places emphasis on support to integrate sensors developed outside of this effort and existing IDS tools 22 (Snort and Bro).

Figure 8:
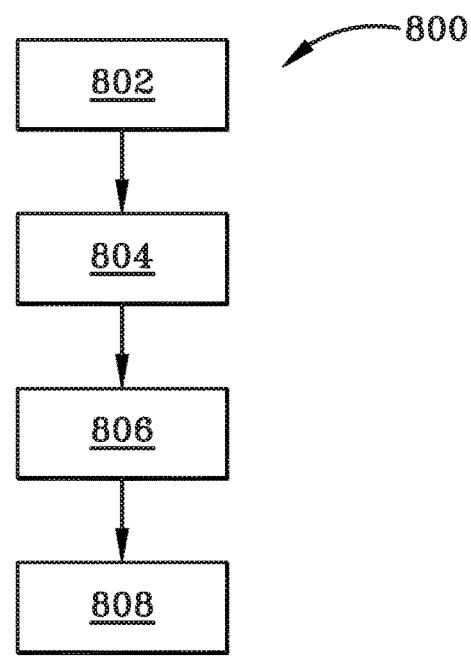
FIG. 8 (FIG. 8) is a flow chart depicts an exemplary method in accordance with one aspect of the autonomous decision maker for improved network resilience.

FIG. 8 is a flow chart depicting a method of a method for network defense generally at 800. Method 800 may include detecting anomalies in network activity, which is shown generally at 802. Method 800 may include analyzing the detected or suspected anomalies to determine a likelihood that network conditions align with network states and suggesting a corrective action based on a current network state, which is shown generally at 804. Method 800 may include generating a list of decisions including courses of action to address the anomalies and effecting an execution of at least one course of action, which is shown generally at 806. Method 800 may include training a system to improve responses in addressing future anomalies, which is shown generally at 808. Method 800 may further include shaping network traffic in response to execution of the at least one course of action. Method 800 may further include dropping at least one packet of information exchanged across a communication link between nodes in the network in response to execution of the at least one course of action.

Method 800 may further include autonomically executing the at least one course of action; and adjusting future executions of courses of action based, at least in part, on training and updating rules via experience gained by making exploratory decisions and execution exploratory course of actions. By way of example, the training may be performed on feedback. Some of the feedback may be manually provided. For example a simple rule could be if the system, particularly the sensor 20, observes traffic from node A to an unknown IP address in a known bad location, the system will block the outbound connection. In another example, node A may be sending traffic to a known IP address of node B that has been seen many times before. However, here the anomaly detector 20 notices that the traffic flow is longer than 5 minutes, while the average time of traffic flow of node A to node B has always been 1 minute. ADMIN system 10 could explore blocking node B after 2, 3, 4, or 5 minutes. ADMIN system 10 can also explore "slowing down" the connection to node B (i.e., traffic shaping). If node B is approved by the Human Administrator after review, then the correct decision would be to slow down network traffic between node A and node B. Over time this would lead to updated "rules" for automated responses.

Method 800 may further include consulting a traffic modeler that evolves operational traffic models based on observed traffic; simulating and estimating, in a decision engine coupled with the traffic modeler, effects of available courses of actions; changing a traffic model based on the simulated and estimated courses of actions; comparing the traffic model to archived models; and removing the anomalies to return network traffic to a normal or recovering state.

Method 800 may further include evaluating, quantitatively and qualitatively, the courses of actions in an automated manner using parallel simulations to rank the courses of actions in the list of decisions. By way of non-limiting example, using simulations, ADMIN system 10 can estimate how much data is transferred by zero blocking, 10% slowdown to 50% slowdown to 100% slowdown. Each of these cases could be simulated in parallel and can predict state of the network 5 minutes from now in just about 30 seconds for networks of size 50-100 nodes. The ranking of each outcome can be slightly more complex, but can ranked the outcomes on a risk matrix. For example, say ADMIN system 10 permits an adversary to exfiltrate data from the network for 5 mins vs 3 mins vs 1 mins vs 0 mins. A higher rank may be applied if the file being sent out is high value like a password file. Similarly, ADMIN system can also provide reward scores for benign transfers. The rank should combine the quantified performance metrics for good users with quantified risks of bad outcomes by bad users. Some actions can also have low cost. If attack suspected, system 10 may save more logs on suspicious machines. System likely will not everything all the time, so at a minimum, system 10 can log data during unusual activity for later forensics. Another way of quantifying CoAs is mission-related Quality of Service for critical flows. If actions are taken to block node B that do not impact the QoS of critical flows, then they should be higher ranked. If the actions impact QoS negatively, then they should be lower rank and may need review. For example, if one needs to have to stream video to a remote location of an attack. If system 10 has to block the source or destination of that flow, the CoA should have a lower rank if there are other CoAs that solve the problem, without disrupting that flow.

Method 800 may further include suggesting a course of action from the courses of action; estimating future impact on the network of applying the suggested course of action; analyzing, via a rule-based engine applying model-based reasoning, a severity of suspected adversarial behavior; and comparing information about a current state of the network against rules and policies, and then suggesting what action to take in responsive to the information in different situations. For example, this may relate generally to DEFCON-like risk levels and corresponding policies. If the network is in peace time operation, system 10 may be willing to allow node A to connect to node B for 5 minutes even if system 10 does not trust node B. If there is a medium threat level, system 10 may block node B after 2 minutes. If there is a high level threat, system 10 may block node B in 5 seconds. If there is a very high level of threat, system 10 can block node B immediately and block node A from connecting to any other nodes in the network.

Method 800 may further include determining a presence of an alert of the anomaly in the network relative to a fact; triggering a rule in response to the fact; executing at least one course of action in response to the rule being triggered; providing the courses of actions to a network simulator for impact evaluation; and evaluating an impact of the course of action on the network. For example, there may be a first fact that all connections from node A must be to node B. An anomaly is detected when an event is detected that node A connected to Node C. Since the first event contradicts the first fact, the decision engine would trigger an action rule. In this particular example, the Action could be call ADMIN system 10 to find the best COA to properly address the first event.

Method 800 may further include providing quantifiable evidence that applying one course of action addresses at least one anomaly; quantifying whether a course of action will reduce network performance and whether the course of action will impact future performance; and predicting future consequences on the network for the course of action.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method for network defense comprising:
   detecting anomalies in network traffic activity with anomaly detectors in a network defense system;
   analyzing the detected anomalies to determine a likelihood that network traffic conditions align with network states and suggesting a corrective action based on a current network state;
   generating a list of decisions including courses of action to address the anomalies and effecting an execution of at least one course of action;
   evaluating, quantitatively and qualitatively, the courses of actions in an automated manner using parallel simulations to rank the courses of actions in the list of decisions before effecting the execution of at least one course of action;
   training a system to improve responses in addressing future anomalies in network traffic activity; and
   adjusting future executions of courses of action based, at least in part, on training and updating rules via experience gained by making exploratory decisions and execution exploratory course of actions.

2. The method for network defense of claim 1, further comprising:
   shaping network traffic in response to the execution of the at least one course of action.

3. The method for network defense of claim 1, further comprising:
   dropping at least one packet of information exchanged across a communication link between nodes in the network in response to the execution of the at least one course of action.

4. The method for network defense of claim 1, further comprising:
   autonomically executing the at least one course of action.

5. The method for network defense of claim 1, further comprising:
   evolving, in a traffic modeler, operational traffic models based on observed traffic;
   simulating and estimating, in a decision engine coupled with the traffic modeler, effects of available courses of actions;
   changing a network traffic model based on the simulated and estimated courses of actions;
   comparing the network traffic model to archived models; and removing the anomalies to return network traffic to a normal or recovering state.

6. The method for network defense of claim 1, further comprising:
    suggesting a course of action from the courses of action;
    estimating future impact on the network of applying the suggested course of action;
    analyzing, via a rule-based engine applying model-based reasoning, a severity of suspected adversarial behavior; and
    comparing information about a current state of the network against rules and policies, and then suggesting what course of action to take in response to the information in different situations.

7. The method for network defense of claim 1, further comprising:
    determining a presence of an alert of the anomaly in the network relative to a fact;
    triggering a rule in response to the fact;
    executing at least one course of action in response to the rule being triggered;
    providing the courses of actions to a network simulator for impact evaluation; and
    evaluating an impact of the course of action on the network.

8. The method for network defense of claim 7, further comprising:
    providing quantifiable evidence that applying one course of action addresses at least one anomaly;
    quantifying whether a course of action will reduce network performance and whether the course of action will impact future performance; and
    predicting future consequences of network traffic activity on the network for the course of action.

9. A system for defending a monitored network, the system comprising:
    at least one non-transitory computer readable storage medium, in operative communication with the system, having at least one set of instructions encoded thereon that, when executed by at least one processor, performs operations to perform network defense, and the instructions including:
    detecting anomalies in network traffic activity with anomaly detectors in the network defense system;
    analyzing the detected anomalies to determine a likelihood that network traffic conditions align with network states and suggesting a corrective action based on a current network state;
    generating a list of decisions including courses of action to address the anomalies and effecting an execution of at least one course of action;
    evaluating, quantitatively and qualitatively, the courses of actions in an automated manner using parallel simulations to rank the courses of actions in the list of decisions before effecting the execution of at least one course of action;
    training a system to improve responses in addressing future anomalies in network traffic activity;
    autonomously adjusting future executions of courses of action based, at least in part, on training and updating rules via experience gained by making exploratory decisions and execution exploratory course of actions without human administration; and
    shaping network traffic in response to the execution of the at least one course of action.

10. The system for defending a monitored network of claim 9, wherein the instructions further comprise:
    dropping at least one packet of information exchanged across a communication link between nodes in the network in response to the execution of the at least one course of action.

11. The system for defending a monitored network of claim 9, wherein the instructions further comprise:
    autonomically executing the at least one course of action.

12. The system for defending a monitored network of claim 9, wherein the instructions further comprise:
    evolving, in a traffic modeler, operational traffic models based on observed traffic;
    simulating and estimating, in a decision engine coupled with the traffic modeler, effects of available courses of actions;
    changing a network traffic model based on the simulated and estimated courses of actions;
    comparing the network traffic model to archived models; and
    removing the anomalies to return network traffic to a normal or recovering state.

13. The system for defending a monitored network of claim 9, wherein the instructions further comprise:
    suggesting a course of action from the courses of action;
    estimating future impact on the network of applying the suggested course of action;
    analyzing, via a rule-based engine applying model-based reasoning, a severity of suspected adversarial behavior; and
    comparing information about a current state of the network against rules and policies, and then suggesting what course of action to take in response to the information in different situations.

14. The system for defending a monitored network of claim 9, wherein the instructions further comprise:
    determining a presence of an alert of the anomaly in the network relative to a fact;
    triggering a rule in response to the fact;
    executing at least one course of action in response to the rule being triggered;
    providing the courses of actions to a network simulator for impact evaluation; and
    evaluating an impact of the course of action on the network.

15. The system for defending a monitored network of claim 9, wherein the instructions further comprise:
    providing quantifiable evidence that applying one course of action addresses at least one anomaly;
    quantifying whether a course of action will reduce network performance and whether the course of action will impact future performance; and
    predicting future consequences of network traffic activity on the network for the course of action.

16. A computer program product including one or more non-transitory machine-readable mediums encoded with instructions that when executed by one or more processors cause a process to be carried out for network defense, the process comprising:
    building models of network behavior based on online and offline observations of network traffic activity;
    detecting anomalies in the network traffic activity with anomaly detectors using the models;
    analyzing the detected anomalies using Partially Observable Markov Decision Processes to determine a likelihood that network traffic conditions align with network states and suggesting a corrective action based on a current network state;

generating a list of decisions including courses of action to address the anomalies and effecting an execution of at least one course of action;

evaluating, quantitatively and qualitatively, the courses of actions in an automated manner using parallel simulations to rank the courses of actions in the list of decisions before effecting the execution of at least one course of action;

training a system to improve responses in addressing future anomalies in network traffic activity; and adjusting future executions of courses of action based, at least in part, on training and updating rules via experience gained by making exploratory decisions and execution of exploratory courses of actions, wherein the adjusting is done automatically by the system.

* * * * *